Figure 1:
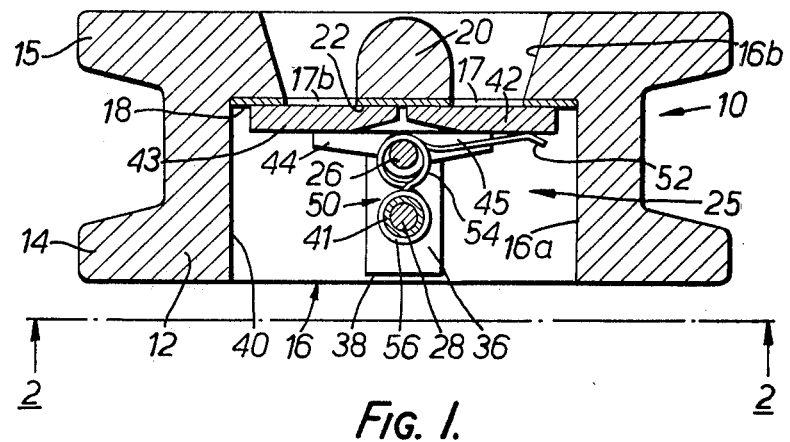

United States Patent [19]
Paton

[11] 4,257,451
[45] Mar. 24, 1981

[54] CHECK VALVE

[75] Inventor: George Paton, Epping, Australia

[73] Assignee: Twinfold Nominees Pty. Limited, Northcote, Australia

[21] Appl. No.: 66,968

[22] Filed: Aug. 16, 1979

[30] Foreign Application Priority Data

Aug. 18, 1978 [AU] Australia .................... PD5577

[51] Int. Cl.³ .................................... F16K 15/03
[52] U.S. Cl. ............................ 137/512.1; 137/527
[58] Field of Search ............... 137/512.1, 527, 527.8; 251/298, 303, 305, 308

[56] References Cited

U.S. PATENT DOCUMENTS

| 2,596,787 | 5/1952 | Ottinger | 251/305 X |
| 3,678,958 | 7/1972 | Satterwhite | 137/512.1 |
| 4,005,732 | 2/1977 | Buckner | 137/512.1 |

FOREIGN PATENT DOCUMENTS 1353178  5/1974  United Kingdom ............... 137/527.8

Primary Examiner—Robert G. Nilson

[57] ABSTRACT

A check valve of the type in which a pair of valve members are hingedly mounted to a transverse pin for pivoting movement between respective open positions and complementary closed positions in which the valve members together engage a valve seat. Torsional spring means are provided to bias the valve members to their closed positions. This means comprises a single length of wire formed into three windings which extend transversely within said passageway, two of which windings separately apply a biasing force to the respective valve members while the third, being between the other two, is wound on an axis offset from the axes of the other two, the arrangement being such as to substantially prevent dissipation of stored compressive energy from either of the respective co-axial windings to the other. Also disclosed is a bearing arrangement for valve pins which are of a material harder than the valve body. According to this arrangement, the pins are supported in plates of a material of hardness similar to the material of the pins set into the internal wall of the valve body.

8 Claims, 2 Drawing Figures

U.S. Patent    Mar. 24, 1981    4,257,451

CHECK VALVE

This invention is concerned generally with valves and more particularly in one aspect with certain constructional improvements to check valves of the type having complementary oppositely pivoting valve members or plates, sometimes referred to as "flappers."

Check valves of the type just referred to are described for example, in U.S. Pat. Nos. 1,413,371, 2,877,792, 3,026,901, 3,452,778, 3,538,946 and 3,831,628. They typically incorporate one or more helical torsional springs which are mounted on the common hinge pin for the valve plates and bias the plates to their closed position. An observable difficulty with these valves is a tendency for the two valve plates to not close simultaneously and for the time delay between their closure to increase with continued use. Because the residual torque available to completely close the second plate may be quite small once the first plate has fully closed, the asynchronism may be further emphasized. It is a primary objective of the invention to reduce this tendency particularly since the non-synchronised closures can gradually diminish the effectiveness of the valves as pressure surges and hammer become evident.

U.S. Pat. No. 4,005,732 to S. P. Buckner proposes a separate helical torsional spring for each valve member. The springs are commonly mounted on the hinge pin which supports the valve plates. The outer legs of the springs engage the respective closure plates or flappers while the inner legs are looped around a second pin spaced from the first. This arrangement is relatively expensive to assemble and the security of the supports at the second pin is suspect with prolonged use.

The present invention provides, in a first aspect, a check valve comprising:
a body with a passageway therethrough;
a valve seat defined by said body about said passageway;
a pin extending across the passageway;
a pair of valve members hingedly mounted to said pin for pivoting movement between respective open positions in the passageway and complementary closed positions in which the valve members together engage said valve seat to close off the passageway; and
torsional spring means to bias the valve members to their closed positions;
wherein the torsional spring means comprises a single length of wire formed into three windings which extend transversely within said passageway, two of which windings separately apply a biasing force to the respective valve members, while the third, being between the other two, is wound on an axis offset from the axes of the other two, the arrangement being such as to substantially prevent dissipation of stored compressive energy from either of the respective co-axial windings to the other.

Preferably, said pin is one of a pair of adjacent, parallel pins which extend across said passageway, and wherein one of these pins mounts the valve member windings and the other the offset intermediate windings. Advantageously, the valve members and the valve member windings of the spring means are mounted to a common one of said pins.

A second difficulty encountered with certain valves, and particularly with check valves of the type referred to, arises from the use of steel valve pins in a cast iron body. The pins, being much harder, perhaps three times harder, than the body have a tendency to relatively quickly washout their locality in the cast iron until eventually the valve components dissociate. A conventional approach to this problem would be to provide a steel bushing or plug to increase the bearing surface between the steel and cast iron but this approach has not always proven economically viable.

In a second aspect, the invention accordingly provides a valve comprising:
a body with a passageway therethrough at least in part defined by an internal wall of said body;
a valve assembly having a condition in which it closes off said passageway;
a valve pin, being part of said assembly, of a material harder than the material of said body, said pin extending from said internal wall across the passageway; and
a plate of a material of hardness similar to the material of the pin set into said wall and affording a bearing for said pin.

The bearing plate may be cast in situ in the valve body or may be inserted after casting into a complementary seat formed in the body during casting.

Both ends of the valve pin may be supported in respective plates of a hardness similar to the pin. A sleeve is advantageously mounted on the pin with its ends abutting, and thereby properly spacing and retaining, the respective plates.

Figure 2:
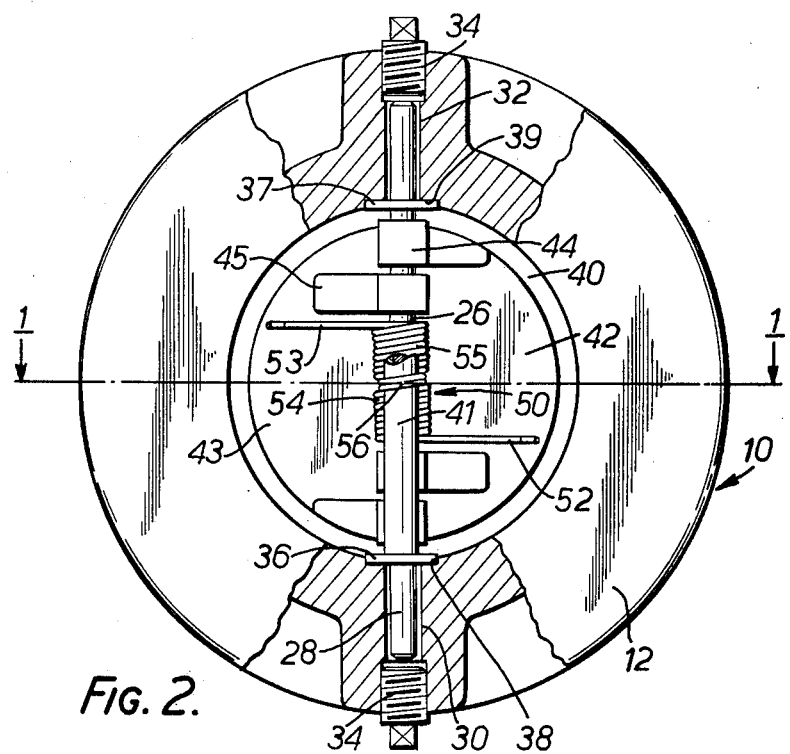

The invention in both of its aspects will be further described by way of example only with reference to the accompanying drawings, in which:

FIG. 1 is an axial cross-section of a check valve constructed in accordance with the invention; and FIG. 2 is a cross-section on the line 2—2 in FIG. 1, one valve pin being cut away for purposes of illustration.

The illustrated check valve 10 includes an annular cast iron valve body 12 flanged at 14, 15 for connection into a liquid supply line. Body 12 bounds a flow passageway 16 having two parts 16a, 16b communicated by a pair of openings 17, 17a separated by a post 20 being an integral part of body 12. Disposed in a common plane about openings 17, 17a is a suitably finished or faced valve seat afforded by an annular shoulder 18 and by a flattened face 22 of post 20.

Valve assembly 25 is mounted in portion 16a of passageway 16 on a pair of steel pins 26, 28 which extend parallel to post 20 through the axis of passageway 16. Pins 26,28 locate in respective pairs of opposed complementary bores 30, 32 in the valve body which extend to the outside of the body but are closed by sealing plugs 34. The pins fit fairly loosely into bores 30,32 and a more precise bearing is afforded by apertures in respective rectangular steel plates 36,37. Plates 36,37 are set over bores 30, 32 into complementary seats comprised of slots 38,39 in the inner wall 40 of the valve body which bounds portion 16a of passageway 16. It will be seen that each of plates 36,37 has two apertures, one for each of the pins 26,28. The plates may have been cast in situ in the body or may be simply placed in position after casting of the body with the requisite slots. They are retained in place by a sleeve 41 mounted on pin 28 with its ends abutting the respective plates.

It will be seen that a substantial increase in bearing surface between the steel and the cast iron, with advantageous irregular boundaries, has been provided with minimal usage of steel, and certainly at lower cost than conventional steel bushings or plugs. In this way, the early washout and eventual valve dissociation which would be expected with the steel pins, steel being substantially harder than cast iron, are largely prevented.

In this case, the valve closure members comprise a pair of semi-circular plates 42, 43 hingeably mounted on pin 26 by way of respective pairs of collared lugs 44, 45. Biasing means in the form of a helical torsional spring 50 is provided to bias valve plates 42, 43 into their closed positions against the valve seat about openings 17, 17a. In use, fluid flow acting from passageway portion 16b opens the valve by pivoting plates 42, 43 against spring 50 oppositely about pin 26 to an open position longitudinally within passageway portion 16a against pin 28.

Spring 50 comprises a single length of spring wire coiled into three windings and having extended portions or legs 52, 53 at its free ends engaging against the rear faces of valve plates 42, 43. Two of the windings 54, 55 have an equal number of turns and are under equal torsion. These windings are coaxial and are supported on the hinge pin 26, while the third winding, 56, has substantially fewer turns about an axis offset from the axis of windings 54, 55. Winding 56 is looped about sleeve 41 and is thus supported by pin 28.

It is found that the divided winding construction of spring 50 is effective to substantially prevent dissipation of stored compressive energy from either of the respective windings 54, 55 to the other, and, accordingly, the biasing force imparted by windings 54, 55 remains effectively equal. In this way, synchronous closing of the two valve plates is sustained, even with prolonged operation of the valve. The unitary form of spring 50 is an advantage in assembly of the valve, while the support of the intermediate winding 56 from pin 28 is secure and reliable.

I claim:

1. A check valve comprising;
    a body with a passageway therethrough;
    a valve seat defined by said body about said passageway;
    a pin extending across the passageway;
    a pair of valve members hingedly mounted to said pin for pivoting movement between respective open positions in the passageway and complementary closed positions in which the valve members together engage said valve seat to close off the passageway; and
    torsional spring means to bias the valve members to their closed positions;
    wherein the torsional spring means comprises a single length of wire formed into three windings which extend transversely within said passageway, two of which windings separately apply a biasing force to the respective valve members, while the third, being between the other two, is wound on an axis offset from the axes of the other two, the arrangement being such as to substantially prevent dissipation of stored compressive energy from either of said two windings to the other.

2. A check valve according to claim 1 wherein said pin is one of a pair of adjacent, parallel pins which extend across said passageway, and wherein one of these pins mounts the valve member windings and the other the offset intermediate winding.

3. A check valve according to claim 2 wherein the valve members and the valve member windings of the spring means are mounted to a common one of said pins.

4. A check valve according to claim 1, 2 or 3 wherein said pin(s) is of a material harder than that of said body, the valve further comprises at least one plate of a material of hardness similar to the material of the pin set into the wall of said passageway defined by said body.

5. A check valve according to claim 4 wherein both ends of each pin are supported in respective plates of a hardness similar to the pin(s), at least one pin carrying a sleeve the ends of which abut the respective plates.

6. A valve comprising:
    a body with a passageway therethrough at least in part defined by an internal wall of said body;
    a valve assembly having a condition in which it closes off said passageway;
    a valve pin, being part of said assembly, of a material harder than the material of said body, said pin extending from said internal wall across the passageway; and
    a plate of a material of hardness similar to the material of the pin set into said wall and affording a bearing for said pin.

7. A valve according to claim 6 wherein both ends of the valve pin are supported in respective plates of a hardness similar to the pin.

8. A valve according to claim 7 further comprising a sleeve mounted on the pin with its ends abutting the respective plates.

* * * * *